G. W. WALTERS.
ANIMAL TRAP.
APPLICATION FILED DEC. 16, 1908.
1,038,246.
Patented Sept. 10, 1912.
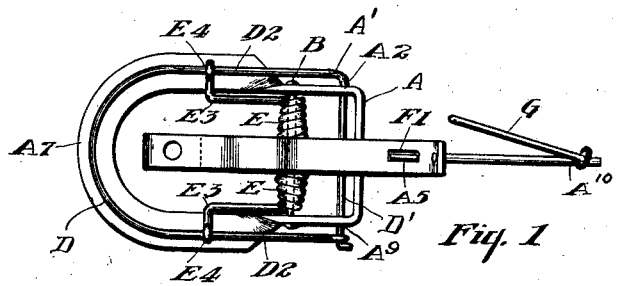
Fig. 1.
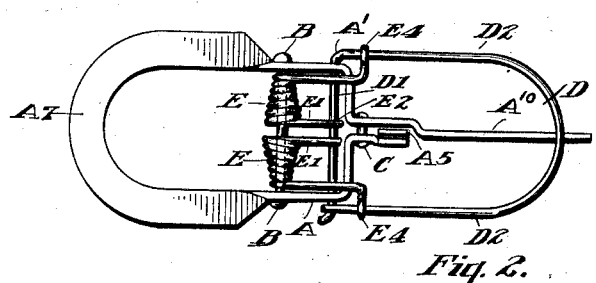
Fig. 2.
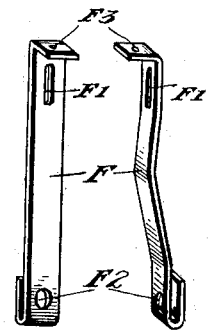
Fig. 7.
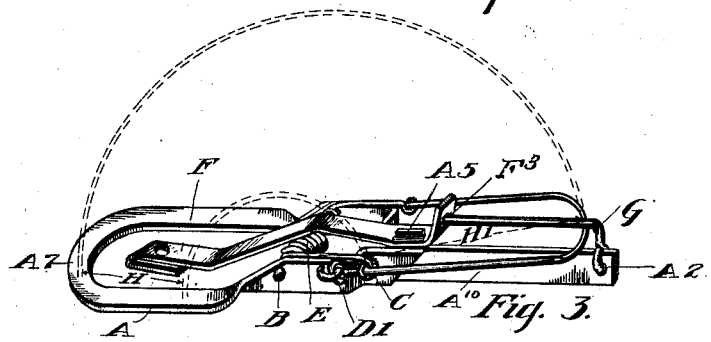
Fig. 3.
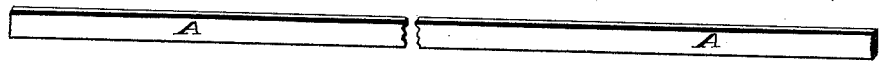
Fig. 4.
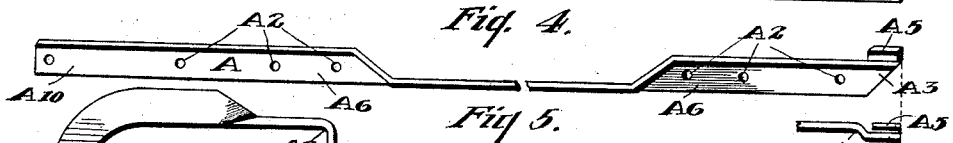
Fig. 5.
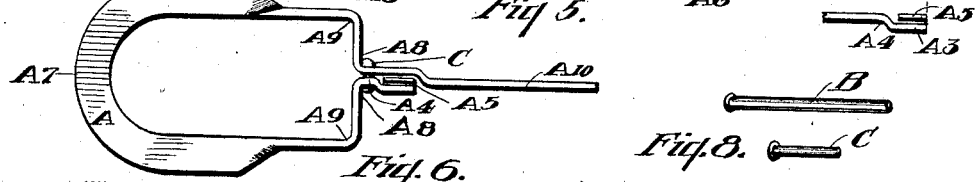
Fig. 6.
Fig. 8.
WITNESSES:
R W Ewing
Eugene E. Anderson
INVENTOR
George W. Walters.
BY
ATTORNEY

UNITED STATES PATENT OFFICE.

GEORGE WILLIAM WALTERS, OF WILDWOOD, PENNSYLVANIA.

ANIMAL-TRAP.

1,038,246.  Specification of Letters Patent.  Patented Sept. 10, 1912.

Application filed December 16, 1908. Serial No. 467,912.

*To all whom it may concern:*

Be it known that I, GEORGE WILLIAM WALTERS, a citizen of the United States, residing at Wildwood, in the county of Allegheny and State of Pennsylvania, have invented new and useful Improvements in Animal-Traps, of which the following is a specification.

My invention relates to that class of impalement traps in which a striker is held under tension and adapted to be released by the combined or interacting movement of a bait-holder and catch and is then impelled by spring means to its inactive position.

This invention has for one of its objects the production of an article of the class described which shall have but few parts, be simple in construction and operation, and more certain in its action than devices of the same kind heretofore used.

Further objects and purposes of this invention will appear from the drawing and the description thereof, and from the claims thereto appended.

In the accompanying drawing wherein is illustrated one of the possible embodiments of my invention, Figure 1 represents a top view of my complete trap showing the parts in their relative positions after the trap has been sprung. Fig. 2 is a view similar to that of Fig. 1 with the striker, however, shown in set position, with certain parts, namely, the bait-holder and retaining means omitted for the sake of clearness. Fig. 3 is a perspective view of my trap showing the relative parts in set position, and showing by dotted lines, the arcs described by the striker and the eyes when the striker is moving to the inoperative position. Fig. 4 illustrates a flat metallic strip from which my entire trap base is constructed. Figs. 5 and 6 show the shape to which this strip is bent in forming my trap base. Fig. 7 shows my bait-holder and catch as first stamped and as later bent for application to the trap base. Fig. 8 shows merely the relative size of the two rivets used in the construction of my trap.

Referring now to the several figures in which like reference characters designate like parts, (A) is a metallic strip which is bent in its central portion at substantially right angles to the end faces, and at the shorter end of which, a portion is bent upwardly at ($A^5$) to form a seat for the catch member (F).

($A^2$) are holes stamped in the strip to hold the rivets and striker shaft. The flat portion of the strip, as bent, is turned to form a horse-shoe shaped platform and at the rear of this platform the vertical ends of the strip are bent at right angles toward each other as at $A^9$ and then again at right angles rearwardly as at $A^8$ so as to lie substantially parallel to each other. One of these ends extends back beyond the other and is provided at its outer end with an aperture. The shorter end is first bent outwardly as at $A^4$ and as before described, is bent upwardly to form the seat ($A^5$), said seat $A^5$ being slightly riveted at the top to prevent the removal of the member F, but to admit of sufficient play about the seat to afford a disengagement of the wire G and the catch $F^3$ when the platform is pressed downwardly.

Toward the rear of the sides of my trap, a striker, preferably formed from spring wire, is mounted, having a bearing in the intermediate holes ($A^2$). This striker comprises a shaft $D^1$, having an integral extension ($D^2$) bent at right angles to itself at ($A^1$). The wire is then bent in a semi-circular shape at (D) and then back parallel to the first side, ending adjacent to the opposite end of the shaft ($D^1$), where it is bent in the form of a hook to grasp that end of the shaft.

Between the platform ($A^7$) and the striker is a rivet joining the sides of the base and having its outer ends riveted at (B) upon the outer faces of the base sides. Coiled about this rivet is a double spring (E), having its inner ends ($E^1$) resting upon the wire or shaft ($D^1$) as at ($E^2$). This double spring which is preferably in the form of a double coil has outer arms continued outwardly at right angles to its support, these arms being in turn right angled upon themselves and bent to form the eyes ($E^4$) which loosely embrace the sides ($D^2$) of the striker.

The tensioning of the spring is such that the outer ends when released will move forwardly and rest upon the platform ($A^7$), and by loosely embracing the sides of the striker, will draw it forward upon the platform and at the same time will slide upward along its sides ($D^2$).

In the aperture ($A^2$) at the rearmost extension of the base ($A^{10}$) is loosely fastened an L shaped trigger (G). The bait-holder and catch (F) as shown in Fig. 3, rests on the base with the projection (A⁵) passing through the aperture (F¹) in the catch. The foremost end of the catch member is bent backward upon itself and the upper side pierced to provide a receptacle for the bait. The rear extensions of the base are connected by means of the rivet (C). The rear of the catch member is bent upwardly at right angles and has a small aperture (F³), adapted, when the bait-holder is raised and the catch tilted back, to receive the free end of the trigger (G).

To set the trap the striker is drawn backward upon the extension (A¹⁰), the trigger (G) brought down over the end of the striker, and the free end inserted in the opening (F³) in the rear of the catch. In this position the catch is tilted backward upon its pivot (A⁵) so that the bait receptacle is slightly elevated. A slight pressure upon the forward end of the catch member withdraws its rear end from the trigger (G) and the striker, then released, is impelled by the spring to its forward position.

As shown in Fig. 3 the force of the spring upon the striker when the trap is set acts much nearer the fulcrum than when the striker is in its inactive position, that is, in rotating to its inactive position, the eyes (E⁴) slide upward along the sides of the striker and the greatest force of the spring is exerted when the striker comes in contact with the platform. From this arrangement there is less liability of accidental springing of the trap to the injury of the person setting it and the catch is more sure of releasing the striker and hence the trap is more sensitive than it would be were the force on the striker as great in its set position as in its inactive position.

It will be seen from the foregoing description that I have invented a trap combining all the advantages of the various animal traps now on the market, intended to catch small animals. Moreover, by the particular arrangement of the parts and the construction of the several members comprising the trap, I have developed an article of manufacture which is simple and involving a minimum of parts, and can be manufactured with much fewer steps in operation than any heretofore placed on the market. Furthermore, the rough material entering into my trap, aside from two small rivets, comprises only a flat metallic strip and spring wire.

Having thus described my invention, what I claim as new and desire to secure by Letters Patent, is:

1. In an animal trap, the combination of a base frame stamped from an integral metal strip, comprising a flat U shaped platform and vertical rearwardly extending arms, one of said arms being turned up to form a catch seat and the other arm extending beyond the former, being adapted to receive one end of a trigger, a spring impelled wire striker having a bearing in the vertical sides of the base, a trigger mounted on the longer arm, and a catch seated on the upturned portion of the shorter arm and adapted to coöperate with the trigger to retain the striker in operative position, substantially as shown and described.

2. In an animal trap, the combination of a base frame comprising a flat U shaped platform, and sides bent at right angles to the face of the platform and extending rearwardly therefrom, and terminating in vertical arms of unequal length, a member connecting the vertical sides of the base, a spring mounted upon said member, a wire striker having a bearing in the vertical sides of the base, the sides of said striker being loosely engaged by the outer ends of the spring, and members mounted at the ends of the rearwardly extending base arms, and adapted to coöperate and hold the striker in operative position, substantially as shown and described.

3. In an animal trap the combination of a base frame formed from an integral metal strip, comprising a flat U shaped platform and rear extensions, said extensions being bent vertical and at right angles to the face of the platform, and bent inwardly toward each other, and then bent rearwardly again and forming arms of unequal length, a member connecting said vertical extensions, a spring impelled integral wire striker having a bearing in said extensions, a trigger mounted at the rear of the longer arm, and a catch member having a seat upon the rear of the shorter arm and having an aperture at its rear end adapted to receive one end of the trigger and hold the striker in operative position, substantially as shown and described.

4. An animal trap having in combination a base frame comprising a horizontal platform portion and a vertical portion integral with the platform, said vertical portion terminating in arms of unequal length, a spring impelled integral wire striker mounted on the base, a catch member having at one end a bait-receptacle and at the other end an aperture, said catch member being seated on the shorter arm of the base, and a trigger mounted on the longer arm and coöperating with the aperture in the catch member to retain the striker in operative position, substantially as shown and described.

5. An animal trap having in combination a base frame stamped from an integral metal strip, and comprising a front horizontal section and a rear vertical section, a member connecting the rear section of the base and a spring impelled integral wire striker having a portion thereof bent to form a shaft and having a bearing in the rear portion of the base, a catch member formed from a metal strip having a bait-receptacle at its front end and having an aperture at the rear end, seated upon an integral upturned portion of the base, a wire trigger connected to the rearmost part of the vertical portion of the base and coöperating with the aperture and the catch member to retain the striker in operative position, substantially as shown and described.

6. In an animal trap a combination of a base frame comprising a flat U shaped platform and integral rear extensions stamped at right angles to the face of the platform, and terminating in substantially parallel arms of unequal length, a rivet connecting the sides of the base at the rear of the platform, a wire striker having an integral portion bent to form a shaft having a bearing in the sides of the base at the rear of the rivet, a double spring coiled about the rivet and having its inner ends resting upon the shaft, the outer ends of said spring being right angled upon themselves and bent to form eyes which loosely embrace the sides of the striker, a catch member seated on the rear of the shorter arm and a trigger connected to the longer arm and coöperating with the catch member to retain the striker in operative position and the spring under tension, substantially as shown and described.

7. In an animal trap a base frame comprising a striker platform, a striker seat integral therewith, and a trigger arm integral with the striker seat, in combination with a striker, a spring having an arm in sliding engagement with the striker, and a trigger for holding the spring in tensioned position.

8. In an animal trap, the combination of a base frame, a striker having an integral part with a rotative bearing therein, a spring having an arm in sliding engagement with the striker, and adapted, when rotating the striker, to move upward thereon.

9. In an animal trap, the combination of a base, a striker having a rotative bearing therein, a spring fixed to the base between the striker bearing and the end of the base and having a sliding engagement with the arm of the striker, whereby the spring slides along the striker arm when it impels the striker forward.

10. In an animal trap, the combination of a base comprising a flat platform and a vertical rear section, an integral wire striker having a bearing in the vertical section, a spring fixed to the base at the forward part of the vertical section, and having arms embracing the two sides of the striker and in sliding engagement therewith, whereby on the forward movement of the spring the striker is impelled forward and the spring arms slide upward along the striker.

11. In an animal trap, the combination of a base, a flat platform and rear vertical section, an integral wire striker having a bearing in the vertical section, a spring fixed to the vertical section between the striker bearing and the platform and having arms in sliding engagement with the striker, and a trigger and catch positioned on the rear extension of the vertical section for holding the striker in set position.

In testimony whereof I have signed my name to this specification in the presence of two subscribing witnesses.

GEORGE WILLIAM WALTERS.

Witnesses:
  W. C. CLARKE,
  C. F. WALTERS.

---

Copies of this patent may be obtained for five cents each, by addressing the "Commissioner of Patents, Washington, D. C."